United States Patent
Nomura et al.

(10) Patent No.: US 10,843,071 B2
(45) Date of Patent: Nov. 24, 2020

(54) INFORMATION PROCESSING APPARATUS, IMAGE DATA DISTRIBUTION METHOD AND PROGRAM

(71) Applicant: Sony Computer Entertainment Inc., Tokyo (JP)

(72) Inventors: Masanori Nomura, Tokyo (JP); Shigetaka Kudo, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 614 days.

(21) Appl. No.: 15/042,772

(22) Filed: Feb. 12, 2016

(65) Prior Publication Data

US 2016/0250556 A1 Sep. 1, 2016

(30) Foreign Application Priority Data

Feb. 27, 2015 (JP) ................. 2015-038523

(51) Int. Cl.
*A63F 13/34* (2014.01)
*A63F 13/86* (2014.01)
*A63F 13/71* (2014.01)

(52) U.S. Cl.
CPC .............. *A63F 13/34* (2014.09); *A63F 13/86* (2014.09); *A63F 13/71* (2014.09)

(58) Field of Classification Search
CPC ........... A63F 13/34; A63F 13/86; A63F 13/71
USPC ........................................ 463/28, 29, 30, 31
See application file for complete search history.

(56) References Cited

U.S. PATENT DOCUMENTS

| | | | | |
|---|---|---|---|---|
| 7,957,612 B1 * | 6/2011 | Ohba | .................. | G06T 1/00 |
| | | | | 382/305 |
| 7,991,905 B1 * | 8/2011 | Roussos | ............ | H04L 29/08729 |
| | | | | 709/231 |
| 9,374,552 B2 * | 6/2016 | Taraki | ...................... | H04N 5/76 |
| 9,854,020 B1 * | 12/2017 | Kum | .................... | H04L 65/604 |
| 2006/0029127 A1 * | 2/2006 | Abiri | ................... | H04N 21/2187 |
| | | | | 375/240.21 |
| 2008/0092185 A1 * | 4/2008 | Kim | .................... | H04L 65/4084 |
| | | | | 725/110 |
| 2008/0205291 A1 * | 8/2008 | Li | ......................... | H04L 47/722 |
| | | | | 370/254 |
| 2009/0030976 A1 * | 1/2009 | Shukla | ................ | H04L 65/4015 |
| | | | | 709/203 |

(Continued)

FOREIGN PATENT DOCUMENTS

| | | |
|---|---|---|
| JP | 2012-34793 | 2/2012 |
| WO | 2013/111247 | 8/2013 |

*Primary Examiner* — Allen Chan
(74) *Attorney, Agent, or Firm* — Katten Muchin Rosenman LLP

(57) ABSTRACT

A technology by which content image data is streaming-distributed in various distribution modes is disclosed an information processing apparatus includes: an execution unit configured to generate image data of a content in response to operation information; an acceptance unit configured to accept a designation of a distribution form of the image data; and a transmission processing unit configured to transmit the image data to a distribution destination. When the acceptance unit accepts a designation of a first distribution form and a designation of a second distribution form, the transmission processing unit transmits first image data and second image data to respective corresponding distribution destinations.

3 Claims, 12 Drawing Sheets

(56) References Cited

U.S. PATENT DOCUMENTS

| | | | | |
|---|---|---|---|---|
| 2009/0193485 A1* | 7/2009 | Rieger | H04N 21/2385 | 725/114 |
| 2010/0094972 A1* | 4/2010 | Zuckerman | H04L 67/1008 | 709/219 |
| 2010/0167809 A1* | 7/2010 | Perlman | A63F 13/12 | 463/24 |
| 2011/0087975 A1* | 4/2011 | Karsten | H04M 1/72586 | 715/762 |
| 2011/0317607 A1* | 12/2011 | Wu | H04L 12/1881 | 370/312 |
| 2012/0210381 A1* | 8/2012 | Ozawa | H04N 21/47202 | 725/114 |
| 2013/0308697 A1* | 11/2013 | Fukuhara | H04N 19/587 | 375/240.02 |
| 2013/0325952 A1* | 12/2013 | Draznin | H04N 21/4126 | 709/204 |
| 2014/0187324 A1* | 7/2014 | Masuda | A63F 13/10 | 463/31 |
| 2014/0344334 A1* | 11/2014 | Trachtenberg | H04N 21/4307 | 709/203 |
| 2014/0351638 A1* | 11/2014 | Chang | H04L 1/08 | 714/18 |
| 2015/0018094 A1* | 1/2015 | Watari | A63F 13/352 | 463/31 |
| 2015/0133214 A1* | 5/2015 | Heath | H04N 21/234354 | 463/31 |

* cited by examiner

FIG.11

BROADCAST GAMEPLAY

IT IS NECESSARY TO STOP GAME RECORDING IN ORDER TO BROADCAST GAMEPLAY
MAY GAME RECORDING BE STOPPED?

YES   NO

◎ DETERMINATION   ✗ RETURN

4

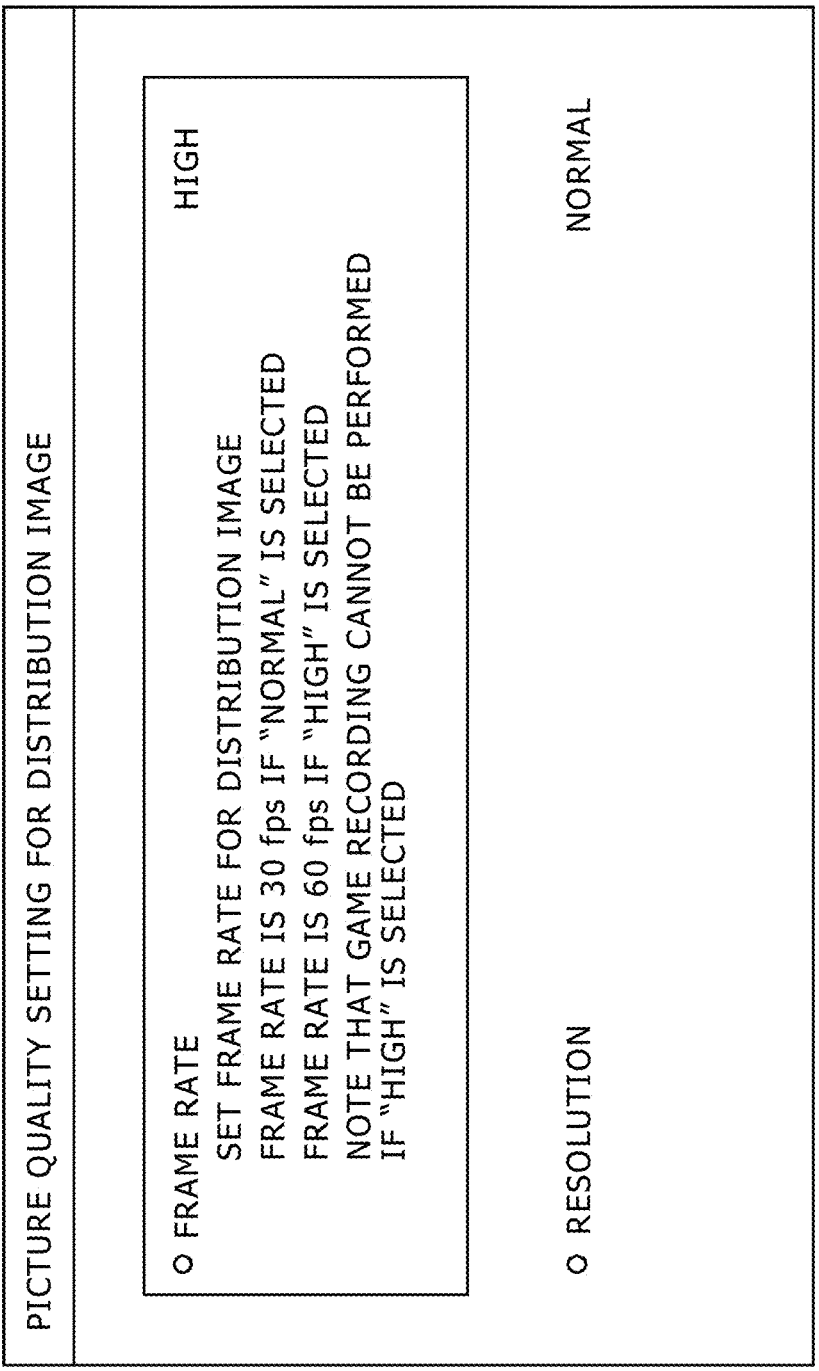

INFORMATION PROCESSING APPARATUS, IMAGE DATA DISTRIBUTION METHOD AND PROGRAM

BACKGROUND

The present disclosure relates to a technology for distributing image data of a content.

In recent years, a service has been spread in which a mowing picture generated or captured by a user is shared through a sharing website. Further, terminals of different users can foe coupled with each other by a peer to peer (P2P) connection to directly communicate with each other. A user can share various kinds of data with a different user utilizing such a mechanism as just described. Japanese Patent Laid-Open No. 2012-34793 proposes a game distribution system in which a game apparatus of a distribution source distributes information relating to a play situation of a game to a game apparatus on the reception side and sine user on the reception side can participate in a game being executed in the game apparatus of the distribution source.

International Publication No. WO 2013/111247 discloses "remote play" wherein a user transmits operation information of a game to an information processing apparatus at a remote place and receives a game image in which operation information is reflected on the game progress from the information processing apparatus.

SUMMARY

The inventor of the present technology disclosed heroin has noticed the possibility of a technology wherein a content image is streaming-distributed to a different terminal apparatus while a content such as a game is executed in an information processing apparatus. In an image distribution system, a technology wherein an information processing apparatus can distribute content image data in various modes raises the availability of the system, and as a result, the value of the system is increased.

Therefore, it is desirable for the present disclosure to provide a technology by which content image data is streaming-distributed in various distribution modes.

In order to solve the subject described above, according to one mode of the present disclosure, an information processing apparatus includes an execution unit configured to generate image data of a content in response to operation information, an acceptance unit configured to accept a designation of a distribution form of the image data, and a transmission processing unit configured to transmit the linage data to a distribution destination. When the acceptance unit accepts a designation of a first distribution form and a designation of a second distribution form, the transmission processing unit transmits first image data and second image data to respective corresponding distribution destinations.

According to another mode of the present disclosure, an image data distribution method includes: generating image data of a content; accepting a designation of a distribution form or image data; and transmitting the image data to a distribution destination. If a designation of a first distribution form and a designation of a second distribution form are accepted at the accepting, then first image data and second image data are transmitted to respective corresponding distribution destinations at the transmitting.

According to a further mode of the present disclosure, a program for a computer, includes: by an execution unit, generating image data, of a content; by an acceptance unit, accepting a designation of a distribution form of imago data; and by a transmission processing unit, transmitting the image data to a distribution destination. When the accepting accepts a designation of a first distribution form and a designation of a second distribution form, the transmitting transmits first image data and second image data to respective corresponding distribution destinations.

It is to be noted that also arbitrary combinations of the constituent elements described above and the representations of the present disclosure obtained by conversion thereof between a method, an apparatus, a system, a recording medium, a computer program and so forth are effective as modes of the present disclosure.

With the present disclosure, the technology in which content image data is streaming-distributed in various distribution modes is provided.

BRIEF DESCRIPTION OF THE DRAWINGS

FIG. 11 is a view depicting an example of a confirmation screen image for inquiring about stopping of game recording; and FIG. 12 is a view depicting an example of a picture quality setting screen image of a distribution image.

DETAILED DESCRIPTION OF THE PREFERRED EMBODIMENT

Figure 1:
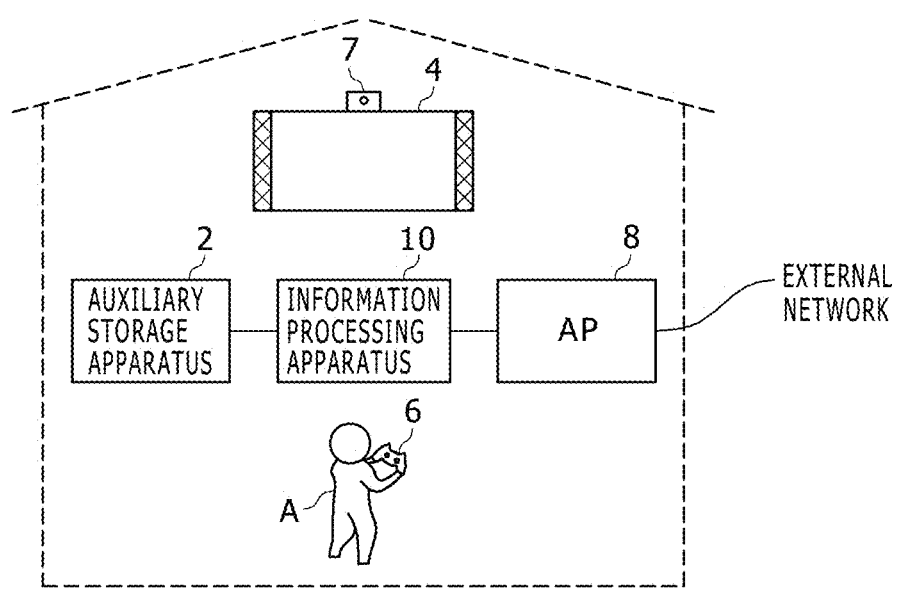
FIG. 1 is a block diagram depicting an example of a usage environment of an information processing apparatus.

FIG. 1 depicts a usage environment of an information processing apparatus 10. Referring to FIG. 1, The information processing apparatus 10 is coupled in wire or wireless communication with an inputting apparatus 6 which is operated by a user. The inputting apparatus 6 provides operation information indicating a result of an operation by the user to the information processing apparatus 10. If the operation information is accepted from the inputting apparatus 6, then the information processing apparatus 10 reflects the received information on a process of system software or application software and causes an outputting apparatus 4 to output a result of the processing. In the embodiment, the information processing apparatus 10 may be a game apparatus on which a game is executed, and the inputting apparatus 6 may be an apparatus for supplying operation information of the user to the information processing apparatus 10 such as a game controller.

An auxiliary storage apparatus 2 is a mass storage apparatus such as a hard disk drive (HDD) or a flash memory, and may be an external storage apparatus to be coupled with the information processing apparatus 10 by a universal serial bus (USB) or the like or may be a built-in type storage apparatus. The outputting apparatus 4 may be a television unit having a display unit for outputting an image thereon and a speaker for outputting sound, or may be a computer display unit. The outputting apparatus 4 may be coupled with the information processing apparatus 10 through a wire cable or may be coupled in wireless communication with the information processing apparatus 10.

An access point (hereinafter referred to as "AP") 8 has functions of a wireless access point and a router, and the information processing apparatus 10 is coupled with the AP 8. In wireless communication or wire communication to couple with an external network.

A camera 7 which is an image pickup apparatus is provided in the proximity of the outputting apparatus 4 and picks up an image of a space around the outputting apparatus 4. While an example is depicted in FIG. 1 in which the camera 7 is attached to an upper portion of the outputting apparatus 4, the camera 7 may be disposed otherwise a lateral side of the outputting apparatus 4. Anyway, the camera 7 is disposed at a position, at which an image of the user who enjoys a game in front of the outputting apparatus 4 can be picked up. It is to be noted that the camera 7 may be a stereo camera.

In order to operate the information processing apparatus 10, the user logs in a operating system (OS) (system software) of the information processing apparatus 10. The user who logs in the system software is managed by a user account registered in the information processing apparatus 10.

A configuration of the inputting apparatus 6 that is a game controller is described below.

Figure 2A:
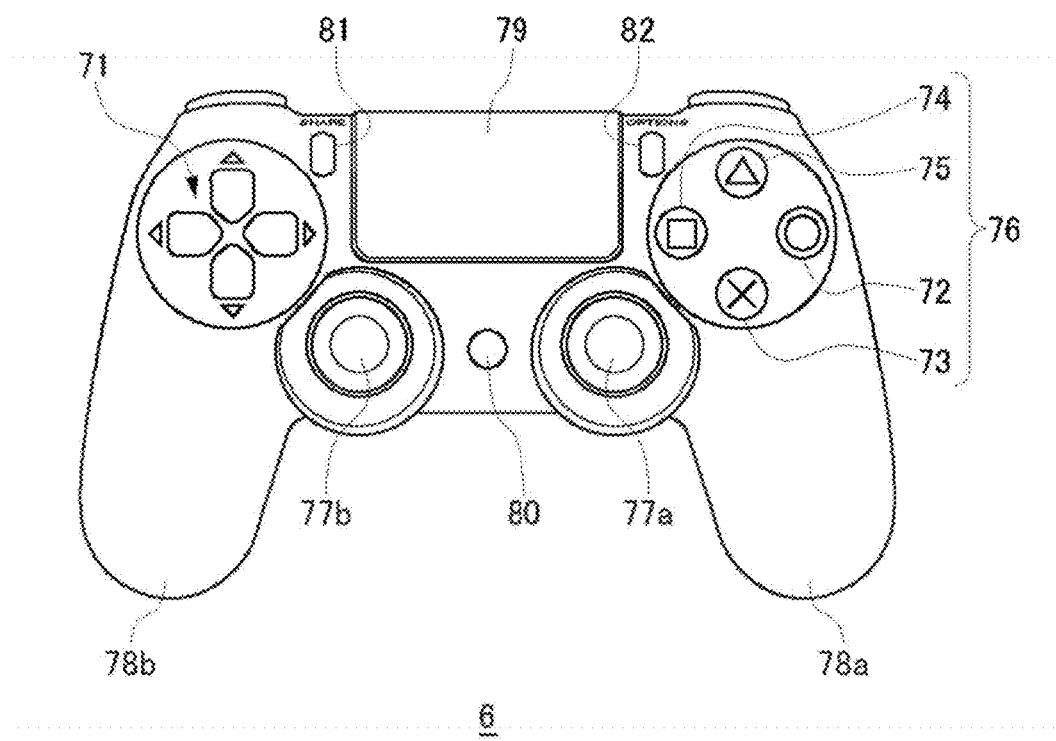
FIG. 2A is a schematic view depicting an appearance configuration of an upper face of an inputting apparatus and FIG. 2B is a schematic view depicting an appearance configuration of a rear face of the inputting apparatus.

FIG. 2A depicts an appearance configuration of an upper face of the inputting apparatus 6. The user would operate the inputting apparatus 6 in a state in which the user grasps a left side grip portion 78b with the left hand thereof and grasps a right side grip portion 78a with the right hand thereof. A direction key 71, analog sticks 77a and 77b and four operation buttons 76 as inputting portions are provided on an upper face of a housing of the inputting apparatus 6. On the four buttons 72 to 75, figures different from each other are marked with colors different from each other in order to distinguish the four buttons. In particular, the circle button 72 is marked with a red round mark; the cross button 73 with a blue cross mark; the square button 74 with a purple square mark; and the triangle button 75 with a green triangle mark. On the upper face of the housing, a touch pad 79 is provided in a flat region between the direction key 71 and the operation button 76. The touch pad 79 functions also as a depression type button which sinks downwardly if it is depressed by the user, and, if the user releases the hand from the touch pad 79, then the touch pad 79 returns to its original position.

A function button 80 is provided between the two analog sticks 77a and 77b. The function button 80 is used to turn on the power supply to the inputting apparatus 6 and render a communication function for coupling the inputting apparatus 6 and the information processing apparatus 10 with each other active at the same time. After the inputting apparatus 6 and the information processing apparatus 10 are coupled with each other, the function button 80 is used also to display a menu screen image on the information processing apparatus 10.

A share button 81 is provided between the touch pad 79 and the direction key 71. The share button 81 is utilized to input an instruction from the user to the OS or the system software in the information processing apparatus 10. An options button 82 is provided between the touch pad 79 and the operation button 76. The options button 82 is utilized to input an instruction from the user to an application (game) executed in the information processing apparatus 10. Both of the share button 81 and the options button 82 may be formed as push type buttons.

Figure 2B:
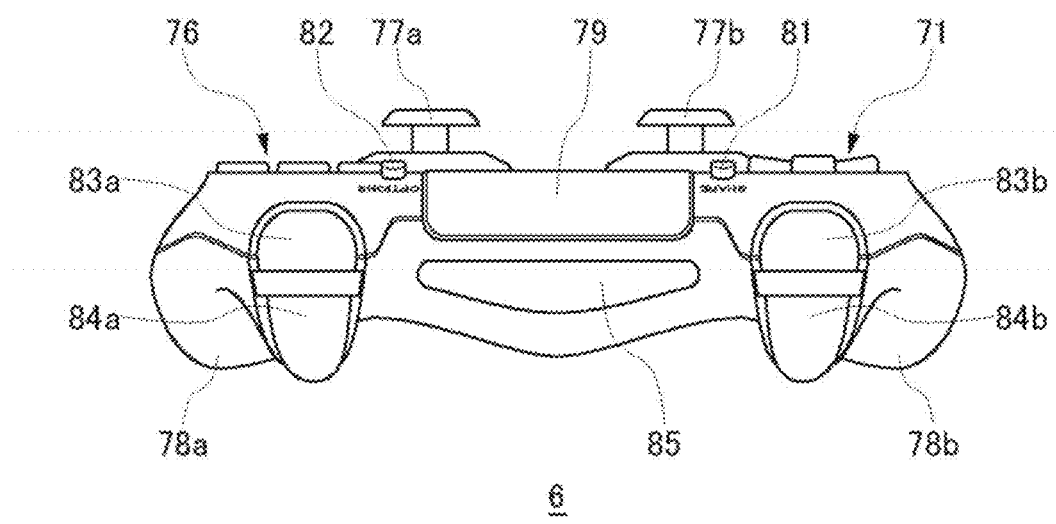

FIG. 2B depicts an appearance configuration of the rear face of the inputting apparatus. The touch pad 79 is provided so as to extend from the upper face of the housing on the upper side of the rear face of the housing of the inputting apparatus 6. A horizontally-elongated light emitting portion 85 is provided on the lower side of the rear face of the housing. The light emitting portion 85 has light-emitting diodes (LEDs) of red (R), green (G) and blue (B) and turns on in accordance with light emission color information transmitted thereto from the information processing apparatus 10. On the rear face of the housing, an upper side button 83a and a lower side button 84a, and an upper side button 83b and a lower side button 84b are provided at symmetric positions in a leftwardly and rightwardly longitudinal direction. The upper button 83a and the lower button 84a are operated by the forefinger and the middle finger of the right hand of the user, and the upper side button 83b and the lower side button 84b are operated by the forefinger and the middle finger of the left hand of the user. The upper side buttons 83a and 83b may be configured as push type buttons, and the lower side buttons 84a and 84b may be configured as trigger type buttons supported for pivotal motion.

Figure 3:
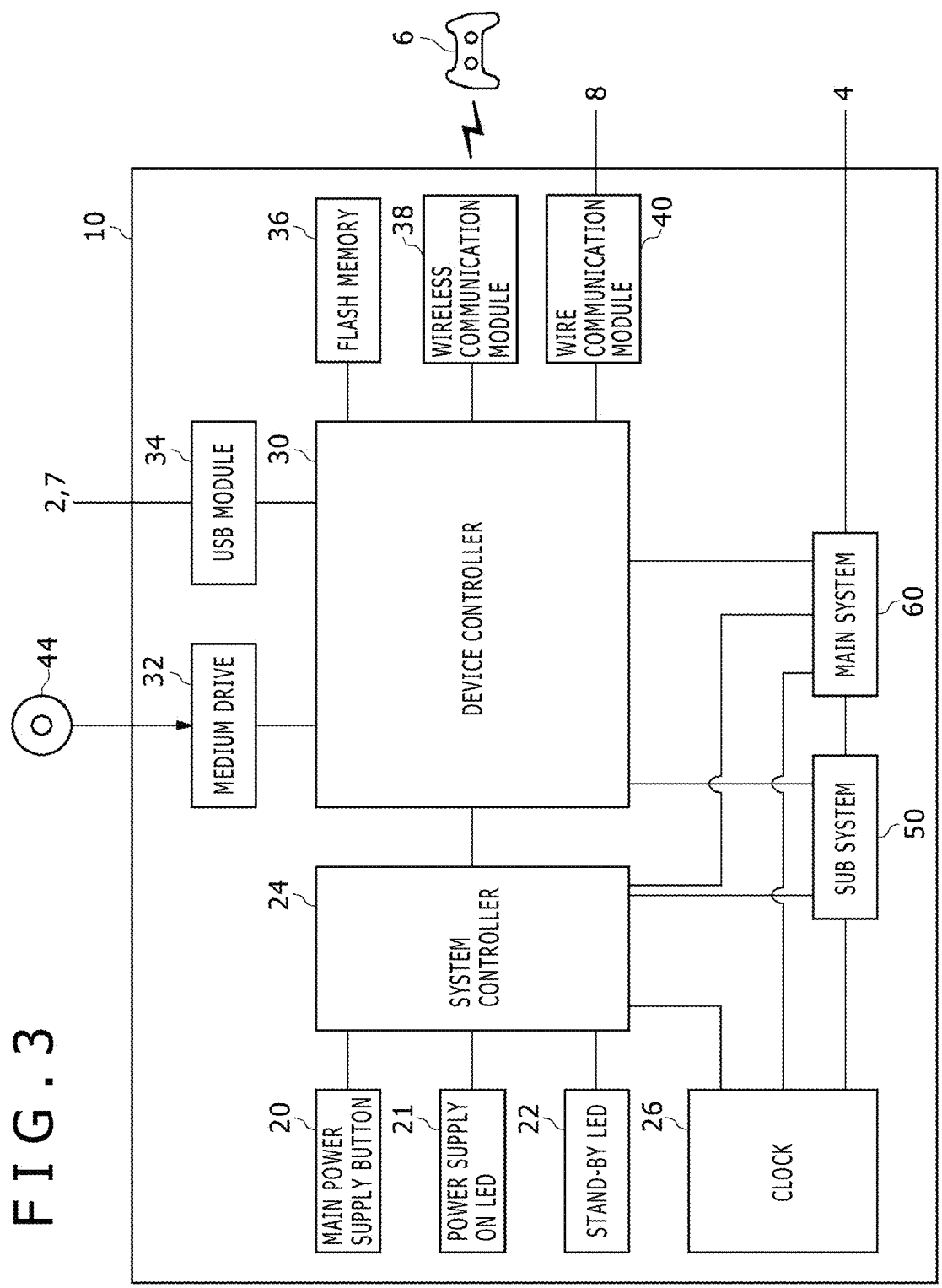
FIG. 3 is a block diagram depicting a functional configuration of the information processing apparatus.

FIG. 3 depicts a functional block diagram of the information processing apparatus 10. The information processing apparatus 10 includes a main power supply button 20, a power supply on LED 21, a standby LED 22, a system controller 24, a clock 26, a device controller 30, a medium drive 32, a USB module 34, a flash memory 36, a wireless communication module 38, a wire communication module 40, a sub system 50 and a main system 60.

The main system 60 includes a main central processing unit (CPU), a memory which is a main storage apparatus and a memory controller, a graphics processing unit (GPU) and so forth. The GPU is utilized principally for an arithmetic operation process of a game program. The functions just described are configured as a system-on-chip and may be formed on one chip. The main CPU has a function for executing a game program recorded on the auxiliary storage apparatus 2 or a read-only memory (RDM) medium 44.

The sub system 50 includes a sub CPU, a memory which is a main storage apparatus, a memory controller and so forth, but does not include a GPU nor has a function for executing a game program. The number of circuit gates of the sub CPU is smaller than that of the circuit gates of the main CPU, and the operation power consumption of the sub GPU is lower than that of the main CPU. The sub CPU operates also within a period within which the main CPU is in a standby state, and is limited processing functions so as to suppress the power consumption low.

The main power supply button 20 is an inputting portion for which operation inputting from the user is carried out and is provided on the front face of the housing of the information processing apparatus 10. The main power supply button 20 is operated to turn on or off the power supply to the main system 60 of the information processing apparatus 10. The power supply on LED 21 turns on when the main power supply button 20 is turned on, and the standby LED 22 turns on when the main power supply button 20 is turned off.

The system controller 24 detects depression of the main power supply button 20 by the user. If the main power supply button 20 is depressed when the main power supply is in an off state, then the system controller 24 acquires the depression operation as "on instruction," and, if the main power supply button 20 is depressed when the main power supply is in an on state, then the system controller 24 acquires the pushing operation as "off instruction."

The clock 26 is a real time clock, and generates date and time information at present, and supplies the generated information to the system controller 24 or the sub system 50 and the main system 60. The device controller 30 is configured as a largo-scale integrated circuit (LSI) for executing delivery or information between devices like a south bridge. As depicted in FIG. 3, the devices such as the system controller 24, the medium drive 32, the USB module 34, the flash memory 36, the wireless communication module 38, the wire communication module 40, the sub system 50 and the main system 60 are coupled with the device controller 30. The device controller 30 absorbs a difference in electric characteristic among the devices or a difference in data transfer speed and controls a timing of data transfer.

The medium drive 32 is a drive apparatus which is driven by the ROM medium 44 mounted thereon, on which application software such as a game and license information are recorded, and reads out a program or data from the ROM medium 44. The ROM medium 44 is a read-only recording medium such as an optical disk, a magneto-optical disk or a Blu-ray disk.

The USB module 34 is a module for coupling with an external apparatus through a USB cable. The USB module 34 may be coupled with the auxiliary storage apparatus 2 and the camera 7 through a USB cable. The flash memory 36 is an auxiliary storage apparatus configuring an internal storage. The wireless communication module 38 carries out wireless communication, for example, with the inputting apparatus 6 by a communication protocol such as the Bluetooth (registered trademark) protocol or the IEEE802.11 protocol. It is to be noted that the wireless communication module 38 may be ready for a third generation digital portable telephone system in compliance with the International Mobile Telecommunication 2000 (IMT-2000) prescribed by the International Telecommunication Union (ITU) and may be further ready for a digital portable telephone system in a different generation. The wire communication module 40 carries out wire communication with an external apparatus and couples with an external network, for example, through the AP 8.

The information processing apparatus 10 of the embodiment has a function for executing a content of a game or the like and streaming-distributing image data of the content being executed in various forms to a different terminal apparatus. The information processing apparatus 10 has a plurality of distribution forms, and encodes content image data in response to a distribution form designated by the user and transmits the encoded image data to a distribution destination designated by the distribution form.

Three distribution forms which can be provided by the information processing apparatus 10 in the game image distribution system 1 are described with reference to FIGS. 4 to 6. In any of the distribution forms, the information processing apparatus 10 operates as an image distribution apparatus which streaming-distributes encoded content image data. In the following description, a game image is described as an example of a content image.

Figure 4:
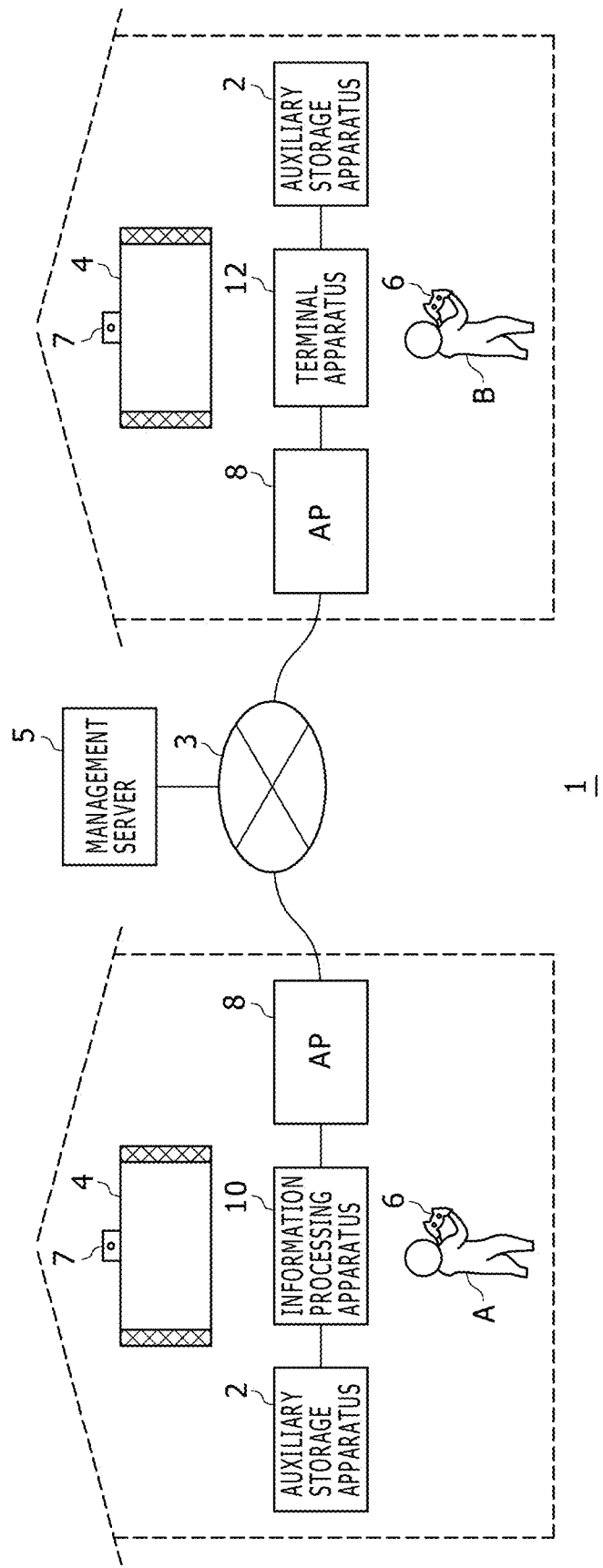
FIG. 4 is a block diagram illustrating a first mode of a distribution form of game image data by the information processing apparatus.

FIG. 4 depicts a first mode of the distribution forms of game image data by the information processing apparatus 10. It is to be noted that, in FIGS. 4 to 6, the management server 5 coupled with the network 3 is depicted. The management server 5 provides a network service of a game to the users of the game image distribution system 1. The management server 5 manages network accounts for specifying the users, and the users sign in the network service provided by the management server 5 using their respective network accounts.

By signing in the network service, a user can register save data of a game or a virtual commendation article (trophy) acquired during gameplay to the management server 5. In order for the information processing apparatus 10 to communicate with a different terminal or a server, the user signs in the management server 5.

The distribution form of a game image according to the first mode depicted in FIG. 4 is referred to as "share play." In the share play, the information processing apparatus 10 streaming-distributes a game image during playing to the terminal apparatus 12 operated by a different user so that the game image is shared by the plurality of users. The user of the distribution source of the game image is referred to as "host" or "host user" and the user of the distribution destination is referred to as "guest" or "guest user."

In the share play, since the terminal apparatus 12 of the guest user is provided with a game image from the information processing apparatus 10 of the host user, the guest user can play a game even if it does not have the game software. It is to be noted that, in order to execute the share play in the embodiment, it is presupposed that the information processing apparatus 10 and the terminal apparatus 12 individually execute a chat application and are chat-coupled with each other. Consequently, the user A and the user B can communicate with each other by voice chat or text chat while sharing a same game image.

In the example depicted in FIG. 4, the user A is the host user and the user 3 is the guest user. The information processing apparatus 10 of the user A and the terminal apparatus 12 of the user B are coupled with each other by P2P communication. Although the terminal apparatus 12 may be a game apparatus having same functions as those of the information processing apparatus 10, it may otherwise be a game apparatus of a different type or may be a smartphone or a tablet.

For the share play, a plurality of modes are prepared, and the host user can select one of the modes.

The first mode of the share play is referred to as "Share Screen," in which the host user shares a game image with the guest user. "Share Screen" is a basic mode of the share play, and upon starting of the share play, "Share Screen" is first act as the sharing mode. In the "Share Screen" mode, although the guest user can view the game image of the host user, the guest user cannot carry out a game operation.

The second mode of the share play is referred to as "Hand over my controller," in which the guest user carries out a game operation in place of the host user while the host user shares the game image with the guest user. In the "Hand over my controlling" mode, the host user transfers the operation right of the game of the host user itself to the guest user, and accordingly, the host user cannot operate the game while only the guest user can carry out a game operation.

The third mode of the share play is referred to as "Hand over another controller," in which, while the host user shares a game image with the guest user, the guest user participates as a new player in the play and plays the game together with the host user. In particular, in the "Band over another controller" mode, the game resource on the host user side is utilized, and the host user and the guest user participate as player 1 and player 2 in the game, respectively, such that the host user and the guest user carry out a game operation together.

Figure 5:
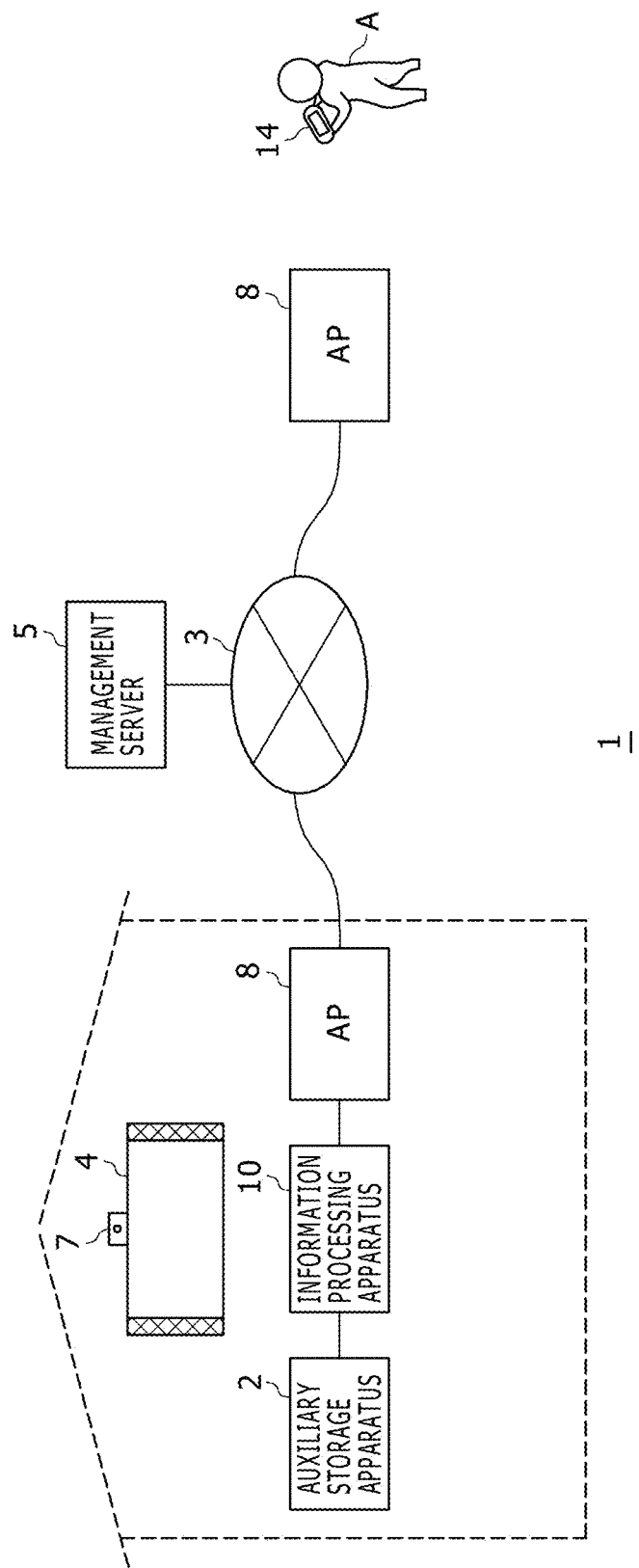
FIG. 5 is a block diagram illustrating a second mode of a distribution form of game image data by the information processing apparatus.

FIG. 5 depicts a second mode of the distribution forms of game image data by its information processing apparatus 10. The distribution form of a game image by the second mode is referred to as "remote plays." in the remote play, the user A operates the information processing apparatus 10, which is located at home, from the outdoor to play a game.

In order to execute the remote play, the user A would operate the terminal apparatus 14 to transmit a coupling request to the information processing apparatus 10. At this time, if the main power supply to the information processing apparatus 10 is in an off state, then the main system 60 is started up in accordance with the coupling request. The main system 60 generates menu image data in which game icons are arrayed and transmits the menu image data to the terminal apparatus 14. Consequently, the terminal apparatus 14 displays a menu screen image on the display apparatus. If the user A selects a desired game icon oft the menu screen image, then the terminal apparatus 14 transmits the operation information to the information processing apparatus 10. The information processing apparatus 10 starts up the selected game, generates game image data and transmits the game image data to the terminal apparatus 14. The terminal apparatus 14 displays a startup screen image of the game on the display apparatus.

In the remote play, the information processing apparatus 10 accepts the operation information from the terminal apparatus 14 as an input to the game and transmits output data outputted to the outputting apparatus 4 to the terminal apparatus 14. Consequently, the terminal apparatus 14 can thereafter display a game image, on which an operation of the user A is reflected, on the display apparatus. The terminal apparatus 14 is an information processing apparatus and many be, for example, a portable game apparatus or may be a smartphone or a tablet. The information processing apparatus 10 and the terminal apparatus 14 are coupled with each other by P2P communication. Also in the remote play, in order for the information processing apparatus 10 and the terminal apparatus 14 to communicate with each other, the user A signs in the management server 5.

Figure 6:
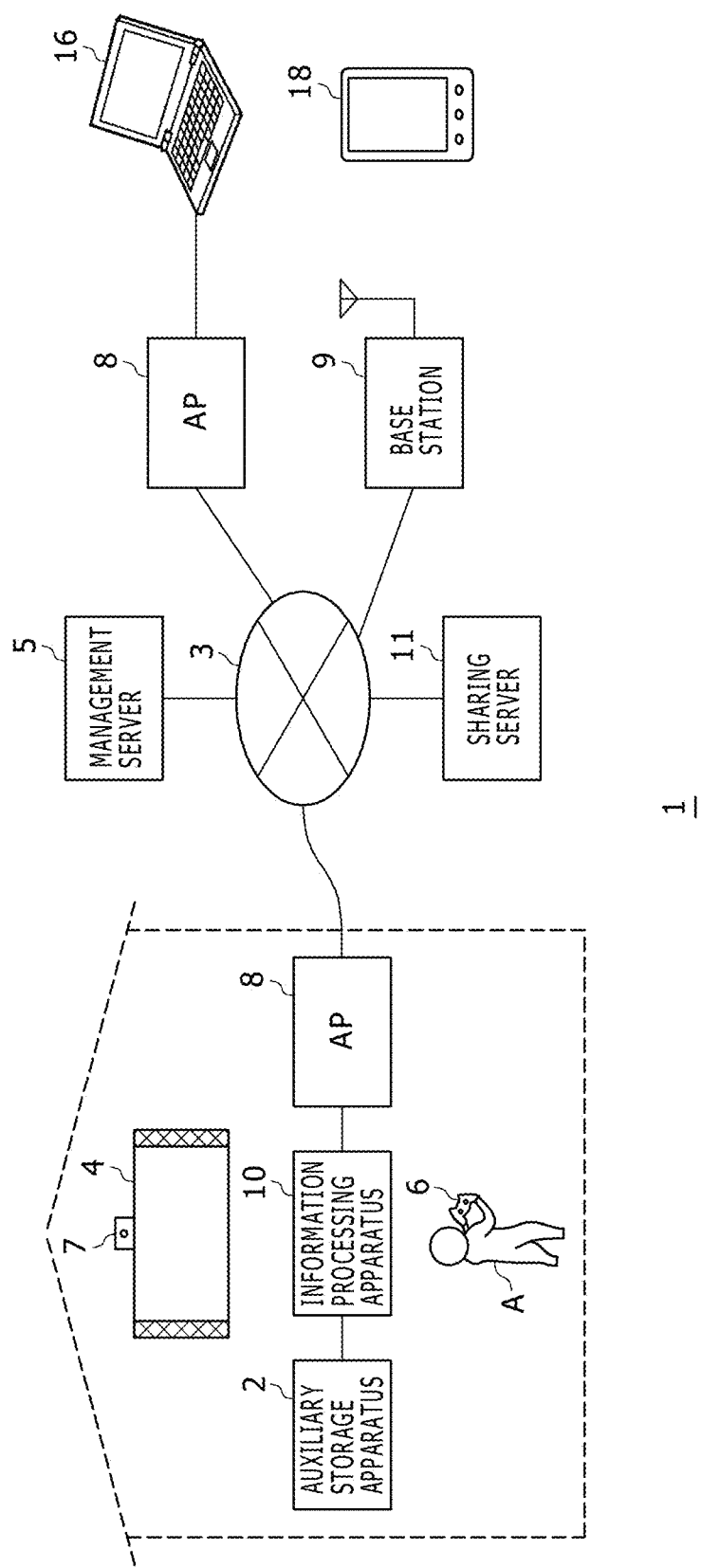
FIG. 6 is a block diagram illustrating a third mode of a distribution form of game image data by the information processing apparatus.

FIG. 6 depicts a third mode of the distribution forms of game image data by the information processing apparatus 10. The distribution form of a game image by the third mode is referred to as "live relay." The sharing server 11 provides a moving image sharing service, and in the live relay, game image data played by the user A is streaming-distributed to the sharing server 11 for a moving picture such that a different user can view the game image data. Consequently, the viewing user can view a game image being live-distributed by accessing the sharing server 11 from the terminal apparatus 16 or 18. Here, the terminal apparatus 16 is a personal computer and couples with the sharing server 11 through the AP 8. Meanwhile, the terminal apparatus 18 is a mobile apparatus such as a smartphone and couples with the sharing server 11 through the base station 9. However, the viewing user may receive live distribution of a game image by a terminal apparatus same as the information processing apparatus 10.

Figure 7:
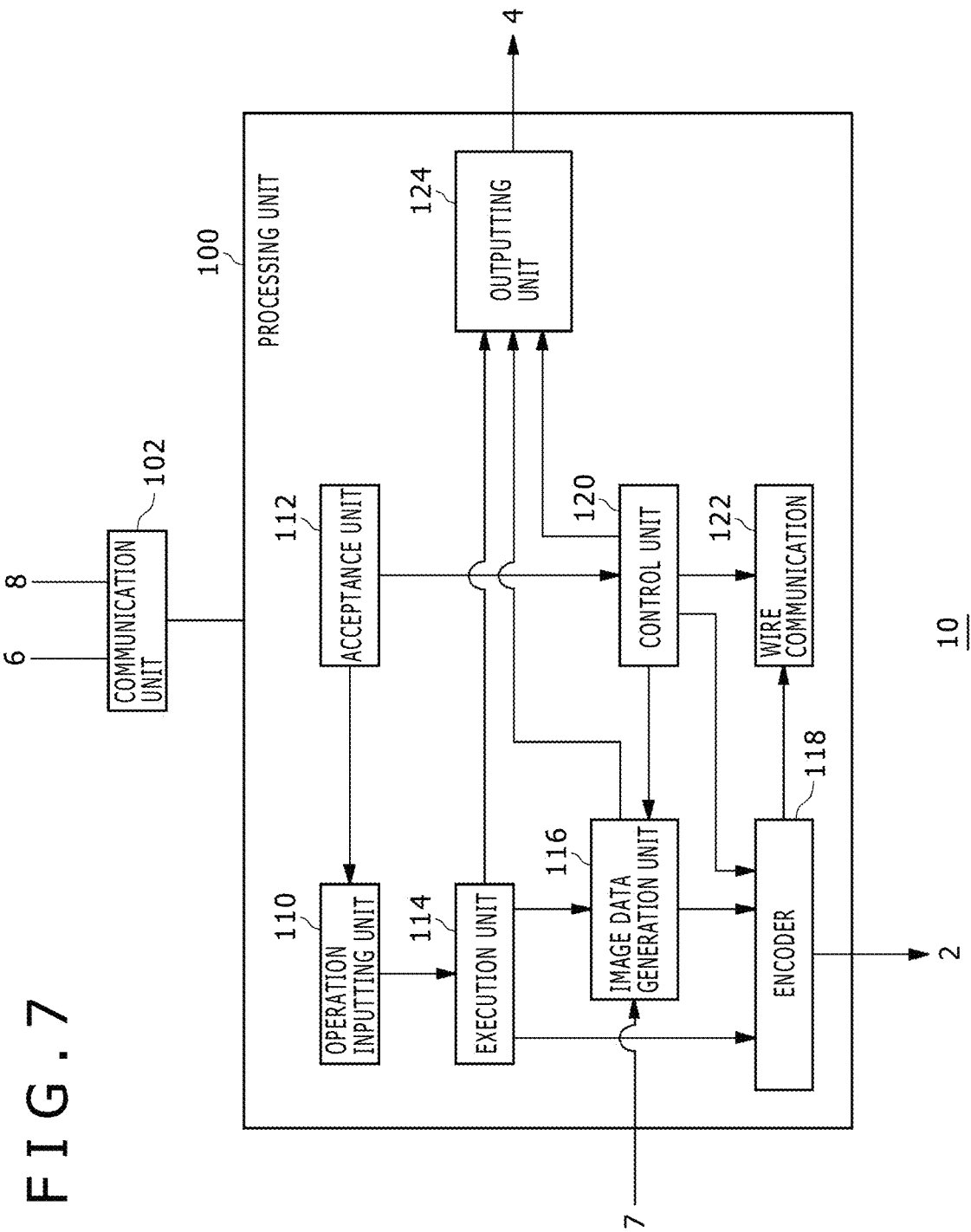
FIG. 7 is a block diagram depicting a configuration of the information processing apparatus.

FIG. 7 depicts a configuration or the information processing apparatus 10. Referring to FIG. 7, the information processing apparatus 10 includes a processing unit 100 and a communication unit 102. The processing unit 100 has a function for encoding an image of a game being executed and streaming-distributing the encoded data in a designated distribution form. The processing unit 100 includes an operation inputting unit 110, an acceptance unit 112, an execution unit 114, an image data generation unit 116, an encoder 118, a control unit 120, a transmission processing unit 122 and an outputting unit 124. The communication unit 102 is represented as a configuration having both of functions of the wireless communication module 38 and the wire communication module 40 depicted in FIG. 3.

The components represented as functional blocks which carry out various processes in FIG. 7 can be configured, in hardware, from a circuit block, a memory and other LSIs, and is implemented, in software, by a program and so forth loaded in the memory. Accordingly, it can be recognized by those skilled in the art that the functional blocks can be implemented in various forms only from hardware, only from software or from a combination of hardware and software and are not limited to any of them.

The execution unit 114 executes a game in response to operation information of the user to generate image data of the game. In the game image distribution system 1, basically the execution unit 114 executes a game in response to operation information from the user A. However, in the "Hand over my controller" mode of the share play, the execution unit 114 executes a game in response to operation information from the user B. Further, in the "Hand over another controller" mode of the share play, the execution unit 114 executes a game in response to operation information from the user A and the user B.

Figure 8:
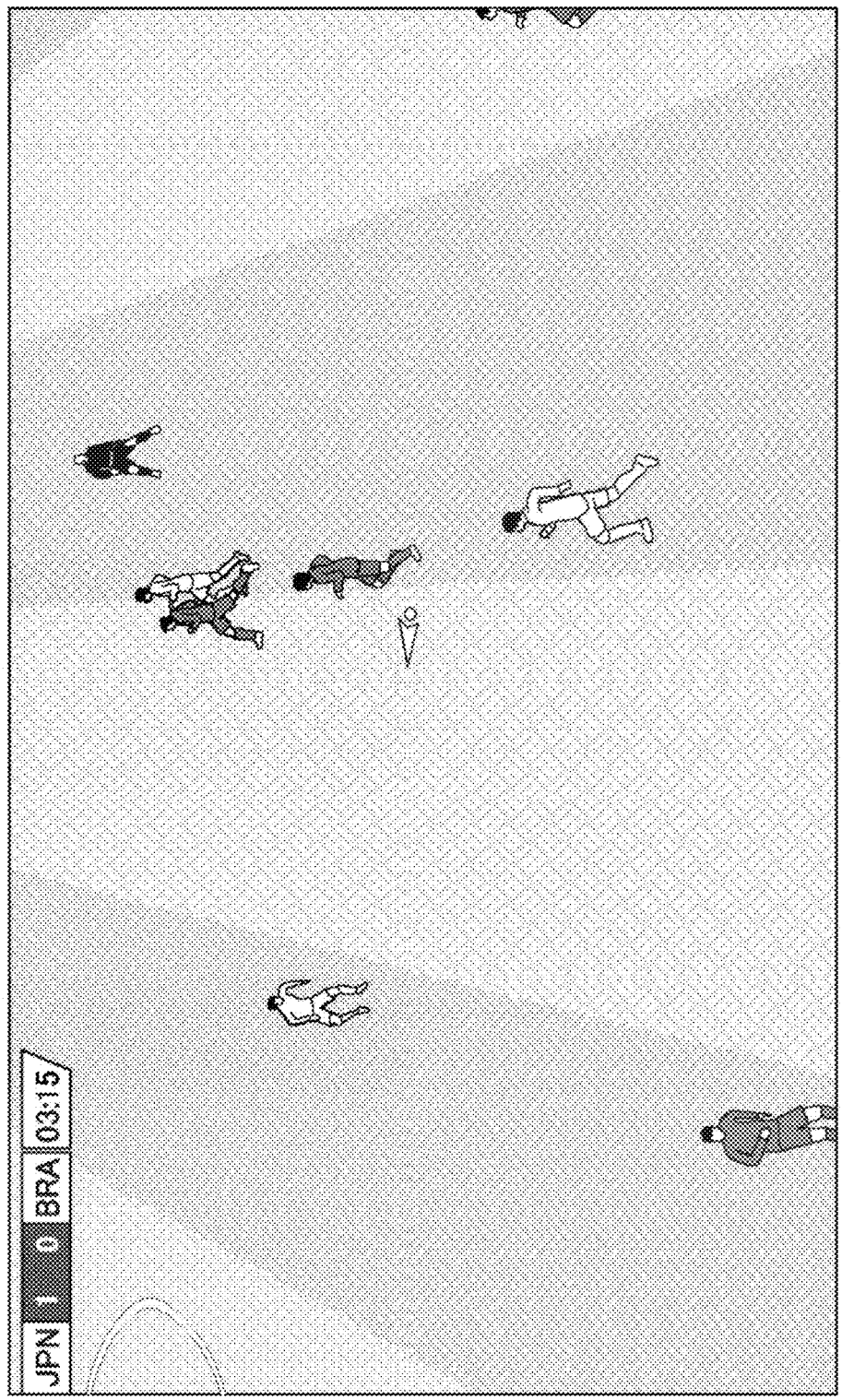
FIG. 8 is a view depicting an example of a game screen image displayed on an outputting apparatus.

The execution unit 114 carries out an arithmetic operation process for moving a game character in a virtual space. The execution unit 114 includes a GPU which carries out a rendering process and so forth, and receives a processing result of a game program to generate image data of the game to be displayed on the outputting apparatus 4. In the present embodiment, a game program which can be processed in a frame rate of 60 fps (frames per second) is executed by the execution unit 114. The outputting unit 124 outputs a game image generated by the execution unit 114 as a display image from the outputting apparatus 4. FIG. 8 depicts an example of a game screen image displayed on the outputting apparatus 4.

The encoder 118 encodes the generated image data. In order to suppress the load to the main CPU, in the present embodiment, a hardware encoder is used. However, a software encoder may be used instead. The encoder 118 has a function for encoding image data in a first frame rate and a second frame rate higher than the first frame rate.

In the embodiment, the encoder 118 is a hardware encoder having a maximum frame rate of 60 fps, and the first frame rate is set to 30 fps while the second frame rate is set to 60 fps equal to twice the first frame rate. Therefore, the encoder 118 can encode data of one image in 60 fps and can encode data of two images each in 30 fps.

Daring gameplay of the user, the encoder 118 samples game image data generated in 60 fps to encode the game image data in 30 fps and records the encoded game image data into the auxiliary storage apparatus 2. It is to be noted that, when the game image data is generated in 30 fps, the encoder 118 encodes the game image data in 30 fps without sampling, and records the encoded game image data into the auxiliary storage apparatus 2. This recording function is a default set function to the encoder 118, and the user can watch and enjoy a game video recorded in the auxiliary storage apparatus 2 later or can upload the game video to the sharing server 11.

The acceptance unit 112 accepts a designation of a distribution form of game image data from the user. In the game image distribution system 1, three distribution forms are prepared including "share play," "remote play" and "live relay." If one of the distribution forms is selected by the user, then the encoder 118 encodes game image data during execution in the first frame rate (30 fps) or the second frame race (60 fps). Then, the transmission processing unit 122 transmits the encoded image data to a distribution destination.

When the acceptance unit 112 accepts a designation of a predetermined distribution form, she image data generation unit 116 may generate image data of a game processed in accordance with the predetermined distribution form. At this time, the encoder 118 encodes the image data processed by the image data generation unit 116.

The distribution forms of "share play" and "live relay" can be selected taking it as an opportunity that the user operates a particular inputting unit provided on the inputting apparatus 6, here, the share button 81. If, during gameplay, the acceptance unit 112 accepts operation information of the share button 81, then the control unit 120 generates a selection image indicating choices relating to sharing of image data and the outputting unit 124 displays a selection screen image on the outputting apparatus 4.

Figure 9:
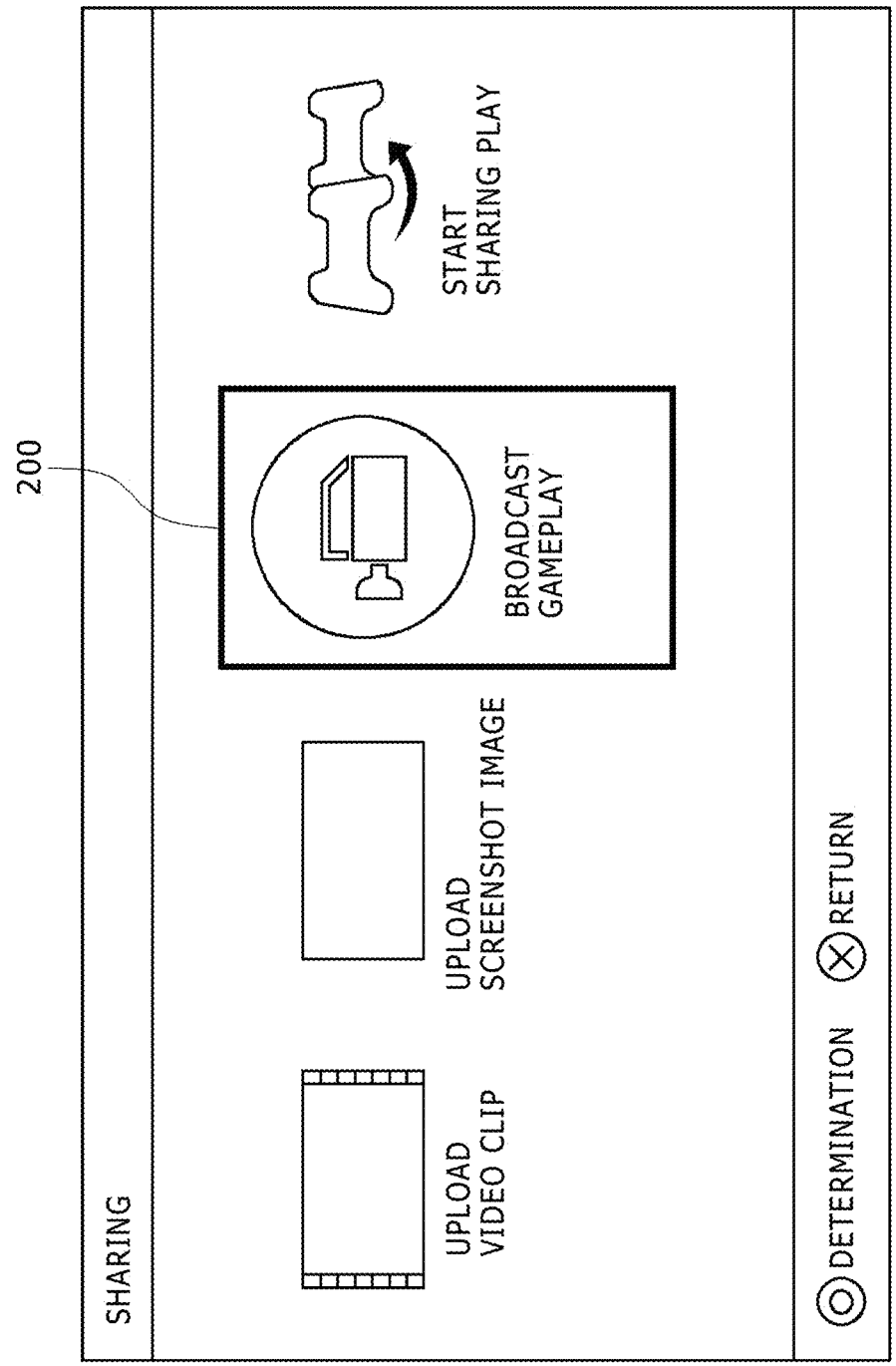
FIG. 9 is a view depicting an example of a selection screen image depicting choices for sharing in a game image.

FIG. 9 depicts an example of the selection screen image which indicates choices of shaping of a game image. On this selection screen image, four choices are displayed. "Upload video clip" is a graphical user interface (GUI) which designates to upload game image data recorded in the auxiliary storage apparatus 2 to the sharing server 11; "Upload screenshot" is a GUI which designates to upload image data of a screenshot to the sharing server 11; "Broadcast gameplay" is a GUI which designates to live relay a play video of a game through the sharing server 11 (refer to FIG. 6); and "Start share play" is a GUI which designates to share a play video of a game with a different user through P2P communication (refer to FIG. 4). From among the four choices, the two choices of "Broadcast gameplay" and "Start share play" correspond to forms of streaming distribution prepared in the information processing apparatus 10.

If the user A moves a designates frame 200 to select the GUI of "Broadcast gameplay" and operates a determination button, then the acceptance unit 112 accepts the designation of "live relay," and the control unit 120 notifies the image data generation unit 116, the encoder 118 and the transmission processing unit 122 that "live relay" is designated. Receiving this notification, the image data generation unit 116 synthesizes the game image and the camera video to generate display image data, and the outputting unit 124 outputs the display image data to the outputting apparatus 4. The encoder 118 encodes the display image data obtained by the synthesis in the first frame rate (30 fps), and the transmission processing unit 122 transmits the encoded data to the sharing server 11. Referring to FIG. 6, the viewing users would view the live play of the user A by operating the terminal apparatus 16 and 18 to access the sharing server 11.

Figure 10:
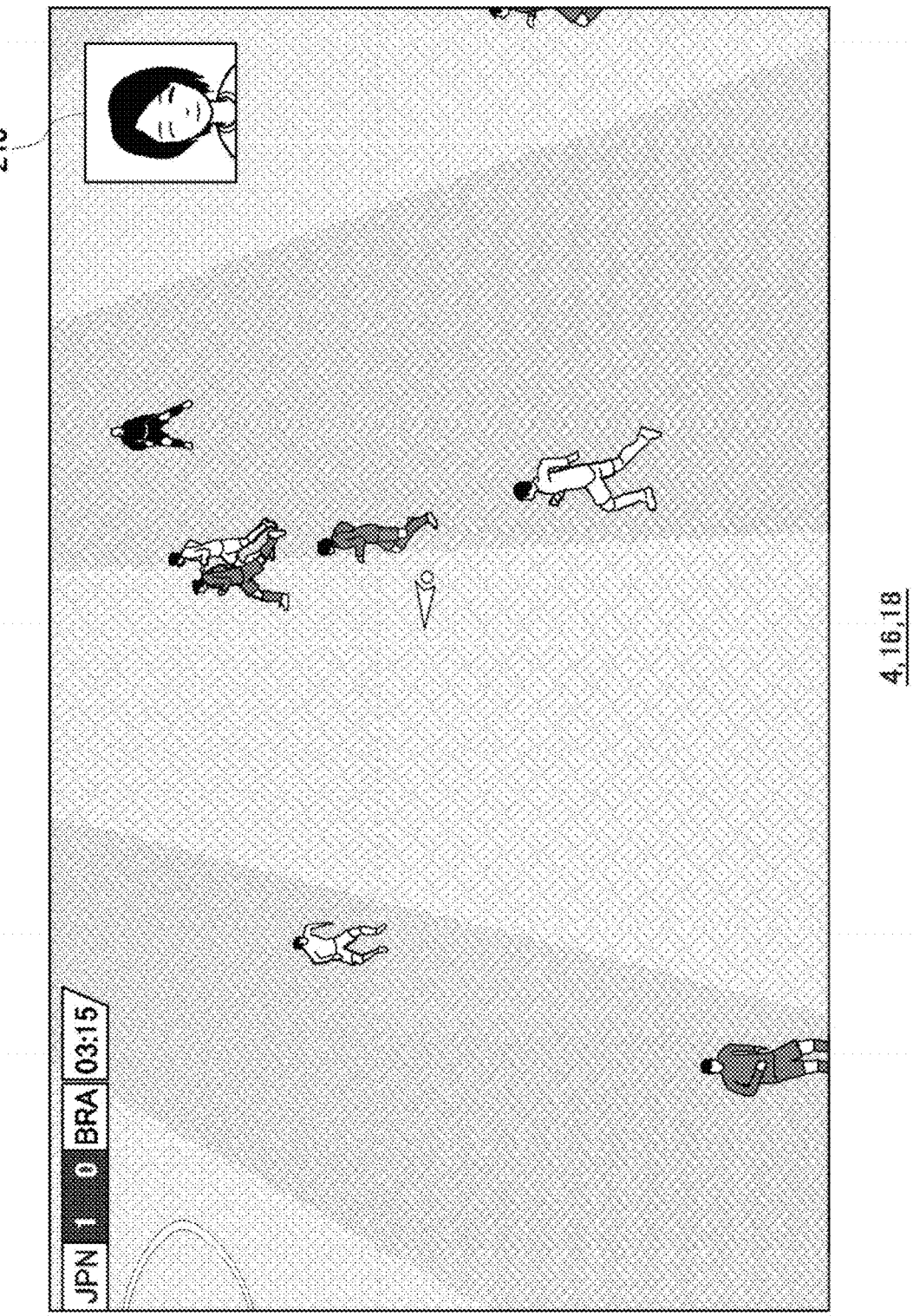
FIG. 10 is a view depicting an example of a distribution screen image by live relay.

FIG. 10 depicts an example of a live-relayed distribution screen image. The camera video picked up by the camera 7 is superimposed on a camera region 210 at a right upper corner portion of the distribution screen image.

If, on the selection screen image depicted in FIG. 9, the user A moves the designation frame 200 to select "Start share play" and operates the predetermined button, then the acceptance unit 112 accepts the designation of "share play," and the control unit 120 notifies the image data generation unit 116, encoder 118 and transmission processing unit 122 that "share play" is designated, and starts up the chat application. If the user A invites the user B to the chat room and then the user B participates as a guest in the share play, then the information processing apparatus 10 and the terminal apparatus 12 are coupled with each other through P2P communication and the user A and the user B start share play (refer to FIG. 4). The image data generation unit 116 may generate image data for the share play. After the share play is started, the encoder 118 encodes the game image data in the first frame rate (30 fps), and the transmission processing unit 122 transmits the encoded data to the terminal apparatus 12 of the user B by P2P communication.

While the distribution form in which a game image is shared with a different user is described above, when remote play is to be executed, the user A would start an application for remote play on the terminal apparatus 14 of the user A itself and accesses the information processing apparatus 10 to start up a game (refer to FIG. 5). In the information processing apparatus 10, when the acceptance unit 112 accepts the designation of "remote play" from the terminal apparatus 14, the control unit 120 notifies the image data generation unit 116, the encoder 118 and the transmission processing unit 122 that "remote play" is designated. The image data generation unit 116 may generate image data for remote play.

In the remote play, the operation inputting unit 110 accepts operation information from the terminal apparatus 14 as an input to the game. After the execution unit 114 the game, the encoder 118 encodes the game image data in the first frame rate (30 fps), and the transmission processing unit 122 transmits the encoded data to the terminal apparatus 14 of the user A through P2P communication.

In the streaming distribution described above, the encoder 118 has two different encoding capacities, and encodes moving image data in 30 fps for game recording and encodes distribution data in 30 fps for game image distribution. By making it possible to allocate the recording function of the encoder 118, which is set in the default, to a different, use, the information processing apparatus 10 can improve the utility of the game image distribution system 1.

In particular, when the user designates the two distribution forms, the control unit 120 controls to stop encoding of the recording data by the encoder 118 but encode the two distribution data. It is to be noted that, while it is assumed in the embodiment that the encoder 118 encodes the two image data in 30 fps, if the picture quality of a distribution image of 20 fps is permitted, then also it is possible to encode three distribution data individually in 20 fps. In this case, if the user designates more than three distribution forms, then the encoder 118 can encode the designated number of distribution data.

During execution of the game, the encoder 118 encodes the image data for recording and stores the encoded image data into the auxiliary storage apparatus 2. If the share button 81 is operated during execution of the game to select the GUI of "share play" (refer to FIG. 9) and share play is started between the user A and the user B, then the acceptance unit 112 accepts the designation of share play and the control unit 120 instructs the encoder 118 to encode the image data for share play. Receiving the instruction, the encoder 118 encodes the image data of the game being executed in the first frame rate (30 fps) to generate first encoded data. The first encoded data is transmitted to the terminal apparatus 12 of the user B by the transmission processing unit 122 (refer to FIG. 4).

If the share button 81 is operated to select the GUI of "live relay" during the share play (refer to FIG. 9), then the control unit 120 decides that the encoder 118 is being used for encoding of the recording image data and share play image data and has no free encoding capacity. Therefore, the control unit 120 generates confirmation image data for confirming whether or not game recording may be stopped, and the outputting unit 124 displays a confirmation screen image on the outputting apparatus 4.

FIG. 11 depicts an example of the confirmation screen image for inquiring about stopping of game recording. Since game recording is set as standard recording in the information processing apparatus 10, it is not preferable to stop game recording without informing the user. Therefore, when there is the necessity to stop game recording in order to carry out game image distribution, this is conveyed to the user.

If the user selects "Yes" on the confirmation screen image, then the acceptance unit 112 accepts the designation of live relay, and the control unit 120 instructs the encoder 118 to stop the encoding for recording but encode the image data for live relay. Receiving the instruction, the encoder 118 encodes the image data of the game being executed in the first frame rate (30 fps) to generate second encoded data. The second encoded data is transmitted to the sharing server 11 by the transmission processing unit 122 (refer to FIG. 6).

In this manner, when the acceptance unit 112 doubly receives two designations of different distribution forms, the transmission processing unit 122 transmits the first encoded data and the second encoded data to the respective distribution destinations. It is to be noted that, while the second encoded data for live relay has a camera video superimposed thereon in the camera region 210 (refer to FIG. 10), the camera video may not be included in the first encoded data for share play. Since the processing unit 100 can streaming-distribute image data simultaneously in a plurality of different distribution forms in this manner, the value of the game image distribution system 1 is enhanced.

The foregoing description is directed to operation when share play is selected first and then live relay is selected as the distribution form of image data. However, also when live relay is selected first and then share play is selected, similar operation is carried out. It is to be noted that, since share play is started when the user B expresses participation as a guest and the user A who is the host consents to the participation of the user B, when the user A consents, preferably such a confirmation screen image as depicted in FIG. 11 is displayed on the outputting apparatus 4.

In the following, an example wherein remote play is selected first as the distribution form of image data is described. If the user operates the terminal apparatus 14 to start remote play, then the acceptance unit 112 accepts a designation of the remote play, and the control unit 120 instructs the encoder 118 to encode image data for recording and image data for remote play. In response to the instruction, the encoder 118 encodes image data of the game being executed individually in the first frame rate (30 fps), records the encoded image data for recording into the auxiliary storage apparatus 2, and provides the image data encoded for remote play to the transmission processing unit 122. The transmission processing unit 122 transmits the encoded data to the terminal apparatus 14 (refer to FIG. 5).

If during the remote play, the share button 81 is operated to select the "live relay" GUI (refer to FIG. 9), then the control unit 120 decides that the encoder 118 is being used for encoding of the recording image data and the remote play image data and has no free encoding capacity. Therefore, the control unit 120 generates confirmation image data for confirming whether the game recording may be stopped, and the outputting unit 124 displays a confirmation screen image on the outputting apparatus 4. The confirmation screen image displayed may be such a screen image as depicted in FIG. 11.

If the user selects "Yes" on the confirmation screen image, then the acceptance unit 112 accepts the designation of live relay, and the control unit 120 instructs the encoder 118 to stop the encoding for recording and encode the image data for live relay. Receiving the instruction, the encoder 118 encodes, the image data of the game being executed in the first frame rate (30 fps) to generate encoded data. The encoded data is transmitted to the sharing server 11 by the transmission processing unit 122 (refer to FIG. 6).

In the present example, operation when remote play is selected first and then live relay is selected as the distribution form of image data is described. However, also when remote play is selected first and the share play is selected as the distribution form of image data, similar operation is carried out.

If the acceptance unit 112 doubly accepts two designations of different distribution forms in such a manner as described above, then the encoder 118 stops encoding of recording data and releases the encoding resource. Consequently, the encoding capacity of the encoder 118 can be utilized fully to encode two image data for distribution.

It is to be noted that, where the acceptance unit 112 accepts only a designation of a single distribution form, the control unit 120 may control the encoder 118 to encode image data in the second frame rate. The frame rate for image data for distribution is set in advance by the user A, and the control unit 120 controls the encoder 118 in accordance with the set frame rate.

FIG. 12 depicts an example of a picture quality setting screen image of an image for distribution. Although the user sets a picture quality from a picture quality setting screen image displayed on the outputting apparatus 4, in the case of remote play, the picture quality setting screen image stay be displayed on the terminal apparatus 14. The user would set the frame rate to "high" or "standard." If "high" is selected, then the frame rate tor an image for distribution is set to 60 fps, but if "standard" is selected, then the frame rate for an image for distribution is set to 30 fps. This screen image notifies the user that, if "high" is selected, then game recording is disabled. It is to be noted that the user can set also a resolution of image data for distribution from the picture quality setting screen image.

The user may set the picture quality for an image for distribution for each distribution form. It is to be noted that, since, in share play, also a guest user participates in the game, also it is possible to provide a setting authority of the picture quality to the guest user. However, if the guest user selects the frame rate of "high," then since the information processing apparatus 10 of the host user receives a penalty that it cannot carry out game recording, also in share play, only the host user is permitted to set a picture quality. It is to be noted that, since, in share play, the host user and a guest user can communicate with each other by chatting, the guest user may freely ask the host user by chatting to change the frame rate to "high."

When the acceptance unit 112 accepts only a designation of a distribution form in which the frame rate is set to "high," the control unit 120 instructs the encoder 118 to encode image data for distribution in the second frame rate (60 fps). Consequently, the encoder 118 generates encoded data in 60 fps, and the transmission processing unit 122 transmits the encoded data to a distribution destination. It is to be noted that, if the acceptance unit 112 accepts a designation of a different distribution form in this state, then the control unit 120 may instruct the encoder 118 to lower the frame rate for image data being distributed to 30 fps and encode the newly designated image data for distribution in 30 fps in order to allow distribution in two different distribution forms.

In this manner, also in the case where the frame rate in a distribution form is set to "high," if two designations of different distribution forms overlap, then the control unit 120 controls the encoder 118 to encode the image data for distribution individually in the first frame rate. It is to be noted that, if the distribution in one of the two distribution forms comes to an end, then the control unit 120 may control the encoder 118 in accordance with the frame rate set for the remaining distribution form. For example, if the frame rate in the remaining distribution form is set to "high," then the control unit 120 may control the encoder 118 to encode image data for the remaining distribution form in the second frame rate. However, if the frame rate for the remaining distribution form is set to "standard," then the control unit 120 way control the encoder 118 to encode image data for the remaining distribution form and image data for recording in the first frame rate.

The present disclosure has been described on the basis of the embodiment. This embodiment is exemplary, and it can be recognized by those skilled in the art that various modifications are possible in combination of the components and processes and also such modifications are included within the scope of the present disclosure. The game executed by the execution unit 114 in the embodiment is an example of a content, and the execution unit 114 may execute (reproduce) a moving picture such as a movie.

In the description of the embodiment, it is described that, when two distribution forms are designated from among three distribution forms, the encoder 118 makes the most of its encoding capacity to encode two image data for distribution individually in 30 fps. In a modification, a priority order may be set to three distribution forms, and when all of the distribution forms are designated, the control unit 120 may control the encoder 118 so that image data of those two distribution forms which have comparatively high priority ranks may be encoded.

Further, while it is described in the description of the embodiment that the encoder 118 has a function for encoding image data in the first frame rate and the second frame rate, in a modification, the encoder 118 may have a function for encoding image data in a first resolution and a second resolution higher than the first resolution. For example, when the acceptance unit 112 accepts a designation of one distribution form, the encoder 118 may be able to encode image data in the second resolution, but when the acceptance unit 112 accepts a designation of two or more distribution forms, the encoder 118 may encode image data in the first resolution.

The present technology contains subject matter related to that disclosed in Japanese Priority Patent Application JP 2015-038523 filed in the Japan Patent Office on Feb. 27, 2015, the entire content of which is hereby incorporated by reference.

What is claimed is:

1. An information processing apparatus, comprising:
an execution unit configured to generate image data of a content in response to operation information;
an acceptance unit configured to accept a designation of a distribution form of the image data;
a transmission processing unit configured to transmit the image data to a plurality of terminal apparatuses; and
an encoder configured to encode an entirety of the generated image data before transmission at a same distribution frame rate to each of the plurality of terminal apparatuses,
wherein the same distribution frame rate is determined by dividing a maximum frame rate of the encoder by a total number of the plurality of terminal apparatuses,
wherein the maximum frame rate is a fixed value.

2. An image data distribution method, comprising:
generating image data of a content;
encoding the image data using an encoder,
wherein an entirety of the image data is encoded at a same distribution frame rate;
accepting a designation of a distribution form of image data; and
transmitting the image data to a plurality of terminal apparatuses,
wherein the same distribution frame rate is determined by dividing a maximum frame rate of the encoder by a total number of the plurality of terminal apparatuses,
wherein the maximum frame rate is a fixed value.

3. A non-transitory computer readable medium having stored thereon a program for a computer, the program comprising:
generating image data of a content;
encoding an entirety of the image data using an encoder at a same distribution frame rate;
accepting a designation of a distribution form of image data; and
transmitting the image data to a plurality of terminal apparatuses, wherein,
wherein the same distribution frame rate is determined by dividing a maximum frame rate of the encoder by a total number of the plurality of terminal apparatuses,
wherein the maximum frame rate is a fixed value.

* * * * *